(12) United States Patent
Strasser

(10) Patent No.: US 9,388,073 B2
(45) Date of Patent: Jul. 12, 2016

(54) PLANT FOR PRODUCING CEMENT WITH CENTRAL GRINDING UNIT

(75) Inventor: Siegfried Strasser, Much (DE)

(73) Assignee: KHD Humboldt Wedag GmbH, Cologne (DE)

( * ) Notice: Subject to any disclaimer, the term of this patent is extended or adjusted under 35 U.S.C. 154(b) by 430 days.

(21) Appl. No.: 13/977,403

(22) PCT Filed: Jan. 4, 2012

(86) PCT No.: PCT/EP2012/050069
§ 371 (c)(1),
(2), (4) Date: Jun. 28, 2013

(87) PCT Pub. No.: WO2012/095338
PCT Pub. Date: Jul. 19, 2012

(65) Prior Publication Data
US 2013/0277471 A1    Oct. 24, 2013

(30) Foreign Application Priority Data

Jan. 12, 2011    (DE) .................... 10 2011 008 967

(51) Int. Cl.
| | |
|---|---|
| B02C 19/00 | (2006.01) |
| C04B 7/43 | (2006.01) |
| C04B 7/38 | (2006.01) |
| C04B 7/52 | (2006.01) |
| F27B 7/20 | (2006.01) |

(52) U.S. Cl.
CPC .............. *C04B 7/43* (2013.01); *B02C 19/0056* (2013.01); *C04B 7/38* (2013.01); *C04B 7/52* (2013.01); *F27B 7/20* (2013.01); *Y02P 40/121* (2015.11); *Y02P 40/20* (2015.11)

(58) Field of Classification Search
CPC .............. C04B 7/43; C04B 7/52; C04B 7/38; F27B 7/20; Y02P 40/20; Y02P 40/121; B02C 19/00; B02C 19/0056
USPC ..................... 241/80, 97, 65, 152.2
See application file for complete search history.

(56) References Cited

U.S. PATENT DOCUMENTS 4,369,926 A * 1/1983 Rasmussen ............. B02C 17/06
241/153

FOREIGN PATENT DOCUMENTS

| DE | 19649663 | 4/1998 |
|---|---|---|
| DE | 102007046834 | 4/2009 |

OTHER PUBLICATIONS

International Search Report, Mar. 12, 2012.

* cited by examiner

Primary Examiner — Mark Rosenbaum
(74) Attorney, Agent, or Firm — Greer, Burns & Crain Ltd.

(57) ABSTRACT

A plant for producing cement, having a first stage for crushing raw material to form raw powder, a second stage for calcination and sintering of the raw powder to form cement clinker, a third stage for cooling the sintered cement clinker, and a fourth stage for crushing the sintered cement clinker to form cement. The first stage for crushing raw material to form raw powder and the fourth stage for crushing the sintered cement clinker to form cement are structurally combined. In this way, during servicing or repair of one crushing stage, the plant need not be shut down because, y variable circuitry switching, the crushing stages permit plant operation with reduced production output.

6 Claims, 1 Drawing Sheet

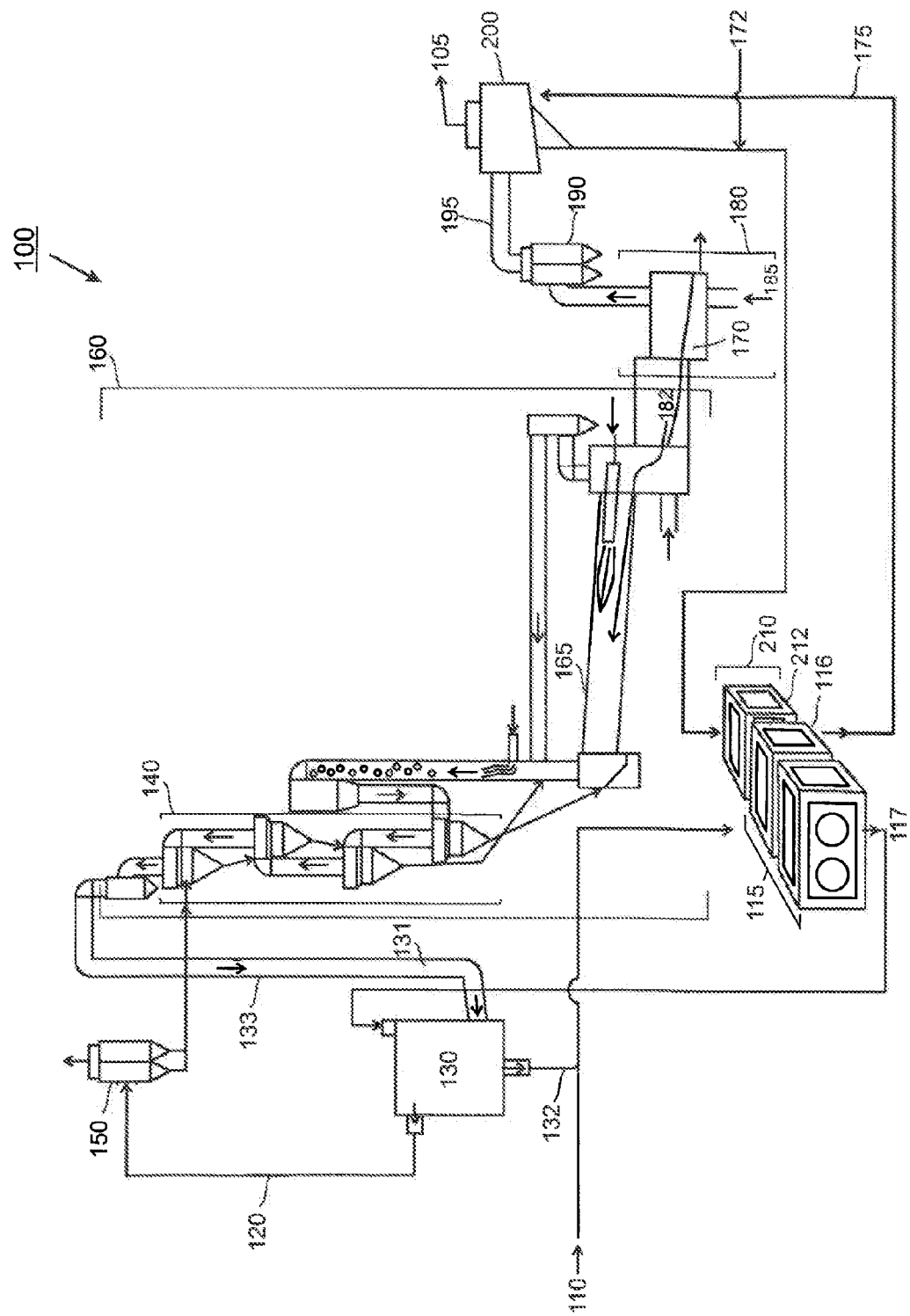

PLANT FOR PRODUCING CEMENT WITH CENTRAL GRINDING UNIT

CROSS-REFERENCES TO RELATED APPLICATIONS

This application claims the benefit of the German patent application No. 10 2011 008 967.5 filed on Jan. 12, 2011, the entire disclosures of which are incorporated herein by way of reference.

BACKGROUND OF THE INVENTION

The invention relates to a plant for producing cement, having a first stage for crushing raw material to form raw powder, a second stage for calcining and sintering the raw powder to form cement clinker, a third stage for cooling the sintered cement clinker, and a fourth stage for crushing the sintered cement clinker.

To produce cement from raw material, a mixture of known composition made of lime-containing rock as raw material firstly passes through a raw powder mill in a first stage, where the raw material is crushed to form raw powder. During the crushing, the raw material undergoes first drying and, in a following second stage, the raw powder is subjected to a heat treatment, firstly $CO_2$ being expelled from the lime-containing rock, formally from the rock powder. Then, in the methods normally used, the rock powder de-acidified in this way is sintered in a rotary kiln, desired calcium silicate phases being formed at high temperature while sintering the individual raw powder particles. In a subsequent step, as third stage, the sintered material is cooled down suddenly in order firstly to feed the heat present in the sintered material back into the process but also to assist the silicate phase formation during quenching. The cooled cement clinker is then temporarily stored and, to produce cement, the cement clinker is ground with additives in a fourth stage to form fine cement powder.

Viewed overall, the cement clinker produced from the raw state as raw material as far as the finished cement passes through crushing at at least two points. Consequently, in a plant for producing cement, it is necessary to maintain at least two grinding installations, which possibly operate differently.

Furnishing different grinding systems requires high logistical effort. Not only is it necessary for different spare parts to be stocked but it is also necessary for the different grinding systems, which not infrequently originate from various providers, to be maintained with different aids and repaired in the event of damage. The necessary stoppage of the various grinding systems during maintenance or repair results in stoppage of the plant, as a result of which the operator must accept high stoppage costs.

In order to avoid the stoppages, it is known to furnish redundant grinding systems in order that these can replace one another when a grinding system is being maintained or repaired. This leads to overcapacity in grinding output in the plant, which is associated with high costs.

SUMMARY OF THE INVENTION

It is therefore an object of the invention to avoid the necessary stoppages during maintenance and repair.

The object of the invention is achieved in that the first stage for crushing raw material to form raw powder and the fourth stage for crushing the sintered cement clinker are combined structurally.

Further advantageous refinements of the invention are specified in the sub-claims.

What is advantageous in the invention is that the grinding systems of the various stages, i.e. the first stage of grinding the raw material to form raw powder and the second stage of grinding the cement clinker with additives, are carried out in a structurally combined grinding unit. If one of the grinding systems of the grinding unit combined structurally has to be stopped, the other grinding system of the structurally combined grinding unit can continue to operate, in order to avoid a plant stoppage. During a partial stoppage of the structurally combined grinding unit, the grinding system still in use can be operated alternately, wherein the grinding system still in use grinds raw material to form raw powder in a first operating phase and grinds cement clinker with additives in another operating phase. If the structurally combined grinding unit comprises a plurality of individual grinding systems, for example a battery of mutually identical or similar grinding systems, it is also possible to connect up different grinding systems variably, depending on the required capacity, to form differently configured grinding systems which, although they operate with a lower grinding output, make it possible to avoid a plant stoppage, since the plant operation can be maintained with a lower production output.

In known plants for producing cement, operators place great value on keeping the expenditure on transport as low as possible. Therefore, in the known grinding plants, the separators which are needed for circulating grinding operation are arranged in the immediate vicinity of the grinding system respectively provided for the purpose. In order to avoid heat and pressure losses during the transport of the gases available out of the process, which are needed for separation in the circulating grinding system, in known plants both the individual mills for the raw material and the mills for the cement are therefore placed at different locations in the plant. However, the advantage obtained here of energy saving and avoiding the transport of the ground material in the grinding circuit is negated by the regular stoppages of the plant during maintenance of the individual grinding systems. Counter to the knowledge that has previously been widespread, a changed configuration of a plant for producing cement is therefore proposed.

BRIEF DESCRIPTION OF THE DRAWINGS

The invention will be explained by using the following FIGURE, in which:

FIG. 1 shows a sketch of a plant according to the invention for producing cement.

DETAILED DESCRIPTION OF THE PREFERRED EMBODIMENTS

FIG. 1 illustrates a sketch of a plant 100 for producing cement 105. To produce cement 105 from raw material 110, the raw material 110 passes first through a first stage 115, in which the raw material 110 is crushed to form raw powder 120 by grinding. Here, depending on the design of the plant, the raw material 110 is firstly input to the roller press as a first stage 115, as illustrated in FIG. 1, or the raw material 110 is first put onto a separator in a circulating grinding plant. During the crushing, the raw material 110 passes first through a high pressure roller press 116, and the ground material 117 falling out of the high pressure roller press 116 is transported via transport means to a separator 130 that is structurally separated from the first stage 115. In the structurally separated separator 130, the ground material 117 pressed into flakes is de-agglomerated and, by means of waste gases 131 from the heat exchanger 140 that follows in the process, is separated into a first coarse fraction 132 and a fine fraction in the form of the raw powder 120. The waste gases 131 from the heat exchanger 140 that follows in the process are fed to the separator 130 via a drop pipe 133 as gas feed line and expelled into the free atmosphere via the separator 130 and the separating stage 150 following the separator 130. The coarse fraction 132 is then combined with the input of the raw material 110 and, together with the raw material 110, is fed again to the first stage 115 until, after multiple passes through the high pressure roller press 116, said coarse fraction has been crushed into raw powder 120.

The raw powder 120 emerging from the separator 130 with the waste gas 131 from the following heat exchanger 140 is introduced, via a separating stage 150 for separating raw powder and gas, into the heat exchanger 140, where it passes through the second stage 160 for calcining and sintering in gas countercurrent. The processes proceeding in the second stage 160 have been documented comprehensively and those skilled in the art are required to view the relevant literature. After the sintered cement clinker 170 has emerged from the rotary kiln 165 into the clinker cooler as third stage 180, said clinker is cooled down quickly in the cooler and the cooling air 182 heated during cooling is led back into the rotary kiln 165 as secondary air. In FIG. 1, a two-stage cooler is illustrated but it is unimportant to the invention whether use is made of a single-stage or multi-stage clinker cooler. The cement clinker 170 partly cooled down in the first stage is cooled down here in the second cooler half with further cooling air 185 as far as an average temperature of less than 100° C., and the cooling air 185 heated in the process is freed of cement clinker dust by a separating stage 190, and, if drying or heating of the product is required, the heated cooling air 185 is then introduced via a gas feed line 195 into a vertical separator 200, where it is used to separate cement fractions which are produced during the crushing of temporarily stored cement clinker 172 with further additives in a fourth stage 210 as crushing stage.

According to the invention, provision is made for both the cement clinker 172 with further additives and for the raw material 110 to be crushed by mutually identical or similar high pressure roller presses 116, 212, which are structurally combined. Here, the separator 200 is separated structurally from the high pressure roller press 212 of the fourth stage 210.

If, as a result of maintenance of individual high pressure roller presses 116, 212, it is necessary to stop the latter temporarily, by means of the plant configuration presented here it is possible to switch the high pressure roller presses 116, 212 at the location thereof as needed such that a stopped high pressure roller press 116, 212 is replaced by a further high pressure roller press 116, 212 at the same location. This mutual replacement is possible only as a result of the high pressure roller presses 116, 212 such as are currently used and which are able to grind both raw material with another material property and also cement clinker with additives to form fine powder.

Provision is made for the separator 130 for crushing the raw material and the separator 200 to be arranged at different points in the plant 100. The ground material 117 from the first stage 115 to be transported in the circuit, and the ground material 175 from the fourth stage 210 to be transported in the circuit must be transported by suitable transport means as a result. Therefore, increased expenditure on transport within the plant 100 is accepted. Since the economic disadvantage of this increased transport expenditure is compensated for by the economic advantage of a reduction in the stoppage times of the plant during maintenance and repair of the grinding plant, this plant configuration has proven to be advantageous.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

| LIST OF DESIGNATIONS | |
|---|---|
| 100 | Plant |
| 105 | Cement |
| 110 | Raw material |
| 115 | First stage |
| 116 | High pressure roller press |
| 117 | Ground material |
| 120 | Raw powder |
| 130 | Separator for raw powder |
| 131 | Waste gas |
| 132 | Coarse fraction |
| 133 | Drop pipe/gas feed line |
| 140 | Heat exchanger |
| 150 | Separating stage |
| 160 | Second stage |
| 165 | Rotary kiln |
| 170 | Cement clinker |
| 172 | Cement clinker |
| 175 | Ground material |
| 180 | Third stage |
| 185 | Cooling air |
| 190 | Separating stage |
| 195 | Gas feed line |
| 200 | Separator for cement |
| 210 | Fourth stage |
| 212 | High pressure roller press |

The invention claimed is:

1. A plant for producing cement, comprising:
a first stage for crushing raw material to form raw powder constructed as a circulating grinding system with a first gas operated separator,
a second stage for calcining and sintering the raw powder to form cement clinker,
a third stage for cooling the sintered cement clinker,
a fourth stage for crushing the sintered cement clinker to form cement constructed as a circulating grinding system with a second gas operated separator,
the first stage for crushing raw material to form raw powder and the fourth stage for crushing the sintered cement clinker to form cement having portions that are structurally combined,
at least one first gas feed line leading from a heat exchanger of the second stage to the first gas operated separator of the first stage to conduct gas for operating the first gas operated separator of the first stage, and
at least one second gas feed line leading from a clinker cooler of the third stage to conduct gas for operating the second gas operated separator of the fourth stage.

2. The plant as claimed in claim 1, wherein
the first and second gas operated separators are separated structurally from a crushing portion of the first stage for crushing raw material to form raw powder and from a crushing portion of the fourth stage for crushing the sintered cement clinker to form cement.

3. The plant as claimed in claim 2, wherein the first stage for crushing raw material to form raw powder and the fourth stage for crushing the sintered cement clinker to form cement include mutually identical grinding systems, wherein an apparatus is provided for distributing the ground material to the first stage and the fourth stage, which distributes the respective ground material variably to the grinding systems.

4. The plant as claimed in claim 2, wherein the first stage for crushing raw material to form raw powder and the fourth stage for crushing the sintered cement clinker to form cement include high pressure roller presses, wherein an apparatus is provided for distributing the ground material to the first stage and the fourth stage, which distributes the respective ground material variably to the high pressure roller presses.

5. The plant as claimed in claim 1, wherein the first stage for crushing raw material to form raw powder and the fourth stage for crushing the sintered cement clinker to form cement include mutually identical grinding systems, wherein an apparatus is provided for distributing the ground material to the first stage and the fourth stage, which distributes the respective ground material variably to the grinding systems.

6. The plant as claimed in claim 1, wherein the first stage for crushing raw material to form raw powder and the fourth stage for crushing the sintered cement clinker to form cement include high pressure roller presses, wherein an apparatus is provided for distributing the ground material to the first stage and the fourth stage, which distributes the respective ground material variably to the high pressure roller presses.

* * * * *